Sept. 21, 1965     F. BEUCHLE ETAL     3,207,267
SELF-ENERGIZING DISK BRAKE
Filed March 21, 1961     2 Sheets-Sheet 2
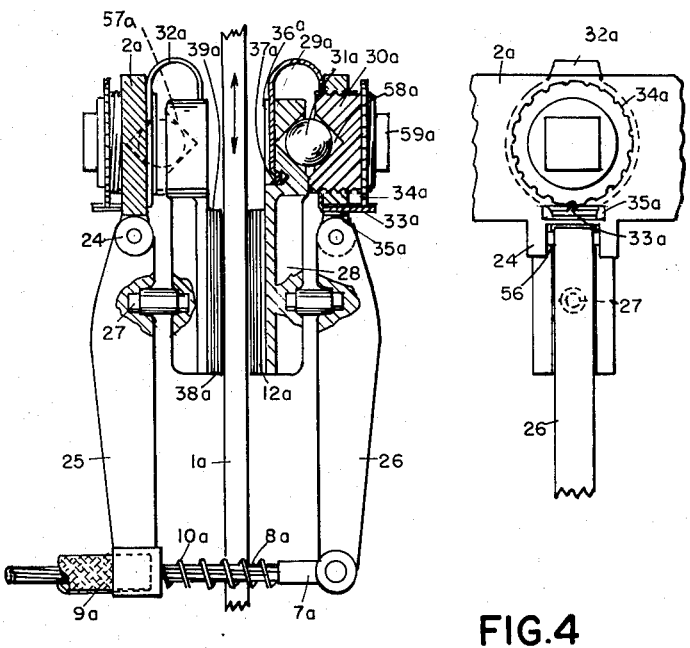
FIG.3     FIG.4
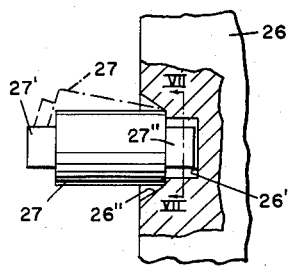
FIG.6
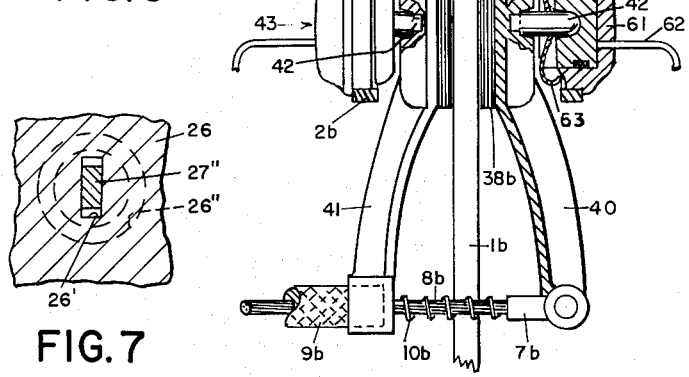
FIG.7
FIG.5
Friedrich Beuchle
Carl Press
        INVENTORS.
BY

United States Patent Office 3,207,267
Patented Sept. 21, 1965

3,207,267
SELF-ENERGIZING DISK BRAKE
Friedrich Beuchle, Frankfurt am Main, and Carl Press, Frankfurt am Main-Bonames, Germany, assignors to Alfred Teves Maschinen- und Armaturenfabrik Kommandit-Gesellschaft, Frankfurt am Main, Germany, a corporation of Germany
Filed Mar. 21, 1961, Ser. No. 97,382
7 Claims. (Cl. 188—73)

Our present invention relates to a manually operated brake of the type normally used as an emergency brake for automotive vehicles, more particularly to a brake of the type wherein a disk is engageable by a pair of brake shoes adapted to exert a clamping action upon an eccentrically located part of its surface.

In such disk brakes a strong clamping pressure is required to generate the torque necessary for decelerating a fast-moving vehicle or similar high-momentum load. It is, however, inadmissible to rely for this purpose on supplementation of the manually exerted force by hydraulic or other non-positive action in the case of a vehicular emergency brake since the law prescribes a mechanism which must be operable under all circumstances, including failure of the hydraulic and/or electric systems.

The general object of our invention, accordingly, is to provide a manually operated brake of the character referred to have highly effective means for mechanically amplifying a manual clamping force without intervention of any hydraulic or electric device; the term "manual operation," in this connection, is to be understood as including actuation by a foot-controlled pedal or the like.

A more specific object of this invention is to provide mechanical force-amplifying means of this character adapted to come into play in a progressive manner and to make its effect felt by the operator as a distinct reaction.

Another object of our invention is to provide a manually operated brake of the type set forth wherein the initial braking force is concentrated on only a portion of the brake-shoe lining whereas the amplified force is subsequently applied to another portion of this lining to insure effective clamping pressure and substantially uniform wear of the lining.

A further object of the instant invention is to provide a brake exhibiting the aforedescribed characteristics in equal measure upon forward and reverse motion.

A more specific object of the invention is to provide a brake of this character adapted to be supplementally but independently actuated by hydraulic means.

In accordance with our present invention we provide, in combination with a disk mounted on a vehicular or other load-entrained shaft, a pair of brake shoes positioned on opposite sides of a peripheral disk portion so as to be limitedly tiltable relative to the plane of the disk about generally radial axes while being also limitedly displaceable parallel to the disk in a direction substantially transverse to these axes, and a clamping mechanism for urging eccentric portions of these brake shoes on one side of their said axes toward each other so as to bring the adjoining disk faces into engagement with respective brake linings carried on these shoes whereby the latter are entrained by the disk into a position in which camming formations on other eccentric portions thereof beyond their axes are urged toward the disk for full-face contact between the brake linings and a coextensive part of the disk.

The clamping mechanism may include a pair of arms, swingable about respective fulcra, with which the brake shoes are connected rigidly or through a pivotal linkage. In the former case the arms themselves must be free to move parallel to the disk faces, their fulcra being then advantageously constituted by rotary bodies (such as balls or rollers) which serve to cam the brake shoe toward the disk upon such parallel motion. In the latter case the arms themselves may have fixed fulcra while the camming action takes place between the brake shoes and a stationary support, advantageously again through the intermediary of rotary elements. The brake shoes are advantageously formed with recesses of generally triangular cross-section, such as V-grooves or conical indentations, to receive minor portions of the rotary bodies which are partly cammed out of these recesses upon a displacement of the brake shoes from a neutral position.

The brake shoes may also be provided with means for driving them toward the disk by independent hydraulic action, e.g., through the intermediary of the clamping arms on which they are carried, so that the system may also be used for ordinary (non-emergency) braking during operation of the vehicle equipped with it.

The above and other objects, features and advantages of our invention will become more fully apparent from the following detailed description, reference being made to the accompanying drawing in which:

FIG. 3 is a partly sectional end-elevational view of a second embodiment of our invention;

FIG. 4 is a fragmentary side-elevational view of the device of FIG. 3;

FIG. 5 is a view similar to FIG. 3, illustrating a third embodiment;

FIG. 6 shows, partly in section, a detail of the assembly of FIGS. 3 and 4; and

FIG. 7 is a cross-sectional view on the line VII—VII of FIG. 6.

Figure 1:
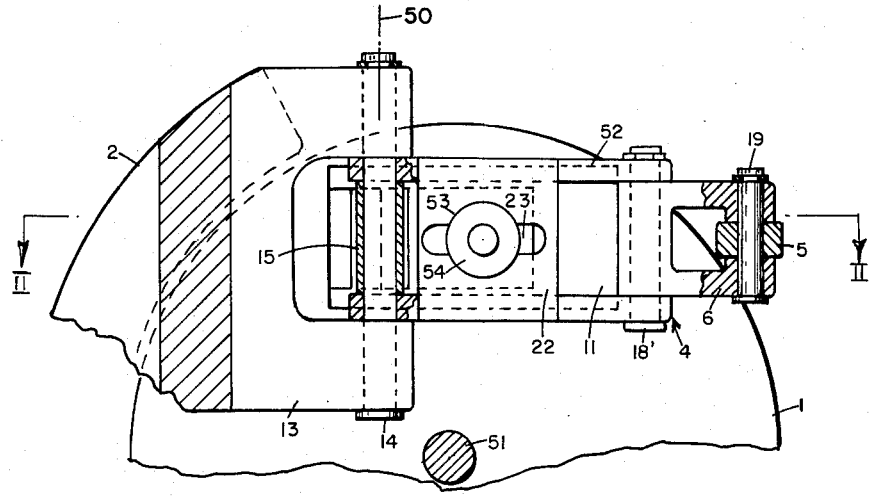
FIG. 1 is a side-elevational view, partly in section on the line I—I of FIG. 2, of a disk brake constituting a first embodiment.
Figure 2:
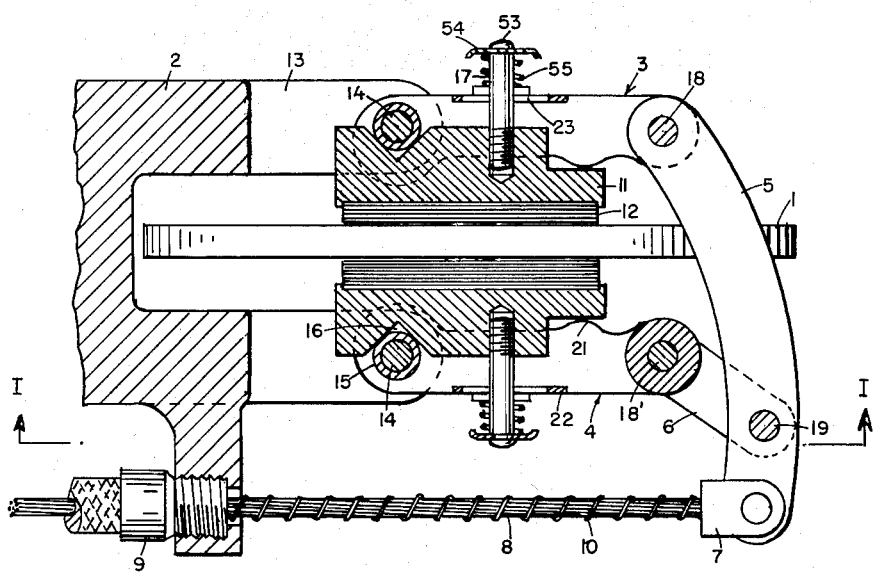
FIG. 2 is a partly sectional view taken from above along line II—II of FIG. 1.

The system shown in FIGS. 1 and 2 comprises a brake disk 1 which is mounted on a vehicular shaft 51 and rotatable therewith. A fixed support 2, which may be part of a brake housing not otherwise illustrated, is provided with two pairs of lugs 13 on opposite sides of disk 1. Each pair of lugs 13 is spanned by a bolt 14 serving as a pivotal axle for a respective clamping arm generally designated 3 and 4; each of these arms consists of two parallel bars 52 which are spacedly mounted on the associated bolt 14 and interconnected by a bridge piece 22 having a central slot 23. At the end remote from bolt 14 the bars 52 are held together by a stud 18 (arm 3) or 18' (arm 4), the former serving as a pivot for an arcuate lever 5 while the latter acts as the pivot of a considerably shorter bifurcate lever 6 articulated to lever 5 via a pin 19. The free end of lever 5 opposite stud 18 has anchored to it, by means of a lug 7, the core 8 of a Bowden wire whose sheath 9 is threadedly secured to an extension of housing 2. A compression spring 10, coiled about the exposed end of core 8, tends to swing the levers 5 and 6 counterclockwise about their respective pivots 18, 18' as viewed in FIG. 2; the other extremity of Bowden wire 8, 9 is connected, in conventional manner not illustrated, to a hand lever or pedal for operating the brake mechanism by a partial withdrawal of core 8 into sheath 9.

The slot 23 of each clamping arm 3, 4 is traversed by a bolt 17 which has its threaded end screwed into a pad which comprises a brake shoe 11 provided with a lining 12; the other end of the bolt carries a cap 54, secured to it by a screw 53, which bears upon a compression spring 55 to exert pressure upon a washer 20 overlying the slot 23. Each brake shoe 11 is thus limitedly displaceable in a plane parallel to the disk, i.e., the plane of FIG. 1, as the bolt 17 slides within slot 23; it is also tiltable together with the bolt in a plane transverse thereto, i.e. the plane of FIG. 2, about a generally radial axis indicated at 50 in FIG. 1, i.e., the axis of the corresponding bolt 14. Each of these shoes is urged by the associated spring 55 into contact with a hump 21 of the corresponding clamping arm 3 or 4 at one of its ends, i.e., the right-hand end remote from the pivot 14 of the clamping arm, and into engagement with a roller 15 on that pivot with its other, left-hand end which has a V-shaped camming groove 16 straddling this roller.

The operation of the system shown in FIGS. 1 and 2 is as follows:

With shaft 51 and disk 1 assumed to be in motion, the operator actuates the Bowden wire 8, 9 to swing the levers 5, 6 clockwise (as viewed in FIG. 2), the resulting knee action forcing the humps 21 of arms 3, 4 and, thereby, the right-hand portions of brake shoes 11 toward each other so that the linings 12 engage the disk 1 at that point. The frictional contact between the disk and the brake linings entrains the latter along with the shoes 11 and the bolts 17 in longitudinal direction, depending upon the sense of motion of the disk 1, along the arms 3, 4 whereby each roller 15, freely rotatable on its bolt 14, ascends one or the other flank of the corresponding V-groove 16. Since the bolts 14 are fixedly located on housing 2, this action cams the left-hand portions of brake shoes 11 inwardly toward the disk, thus causing the brake linings 12 to make full contact therewith. The pivotal movement executed by the brake shoes at this instant produces a reaction at the humps 21 and, consequently, at the control end of the Bowden wire 8, 9 which is under tension from the driver's hand or foot; this reaction will be felt by the driver as an increased resistance but, as it will immediately be taken up by the usual backstop pawl of the emergency brake, will not require any additional effort on the part of the operator.

If the brake system shown in FIGS. 1 and 2 is operated at standstill, only the directly clamped right-hand portions of brake linings 12 will make contact with the disk 1 until, e.g., by gravity with the vehicle parked on an incline or by an external force such as a push from another car, shaft 51 is set in motion to entrain the brake shoes 11 in chordal direction of the disk as previously described. When this occurs, the rollers 15 will again coact with the flanks of grooves 16 to reinforce the clamping action produced by the locked brake-control member.

The system shown in FIGS. 3 and 4 has the disk 1a sandwiched between linings 12a of a pair of brake shoes 28 which are connected with a pair of clamping arms 25, 26, at approximately the center of each lining, via a limitedly swivelable pressure-transmitting pin 27 affording substantially the same degree of freedom as the slot-guided bolts 17 of the preceding embodiment. Arms 25, 26 are pivoted to the stationary housing part 2a by means of bolts 56 passing through lugs 24; their opposite extremities are respectively engaged by the sheath 9a and by the anchor lug 7a of core 8a of a Bowden wire equipped with a compression spring 10a. The brake shoes 28 are provided, beyond the linings 12a, with extensions 29a forming conical recesses 57a which face similar recesses 58a in a nut 30a adjustably screwed into housing 2a. A spherical ball 31a is partly received in each pair of recesses 57a, 58a so as to maintain the associated brake-shoe extension 29a slightly spaced from the corresponding nut 30a at least at its outer end, a U-shaped spring 32a engaging these elements in such manner as to tend to maintain the inner end of extension 29a in contact with nut 30a, acting as a counter-bearing therefor, as shown in FIG. 3. Spring 32a has an outwardly bent extremity 33a which passes through a slot 35a in housing 2a and is formed with a ridge resiliently engaging one of the peripheral notches of the milled flange 34a of nut 30a, thereby yieldably indexing it in a selected position of adjustment; such adjustment may be effected with the aid of a suitable wrench engaging the square head 59a of the nut. The opposite extremity of spring 32a has a re-entrant formation 37a anchored in a slot 36a of shoe extension 29a. Spring 32a, snugly fitting into slots 35a, 36a and tightly surrounding nut 30a, thus secures the brake shoe 28 against major lateral displacement; when the clamping pressure is released, it immediately returns the brake shoe to its illustrated normal position.

As will be apparent from FIGS. 6 and 7, the pin 27 has flattened extensions 27', 27" which are received in slots 26' in the respective arm 25, 26. The slot 26' permits swiveling motion of the pin, whose shoulder rests in a frustoconical recess 26", into an inclined position as shown in dot-dash lines.

In operation, clamping pressure manually exerted upon the projecting ends of arms 25, 26 through the Bowden wire 8a, 9a against the action of spring 10a forces the lower ends 38a of linings 12a against the surface of disk 1a as the brake shoes 28 pivot about the spheres 31a in opposition to their restoring 32a. When the disk 1a moves, the shoes 28 are longitudinally displaced with respect to these arms and force the spheres 31a to ascend opposite ramps formed by the surfaces of the recesses 57a, 58a whereby the upper ends 39a of the brake linings are likewise driven into contact with the respective disk faces. This reinforcing action may again occur immediately after the manual braking operation (in the case of a moving vehicle) or at some later time.

The system of FIG. 5 is generally similar to that shown in FIGS. 3 and 4, corresponding elements having been designated by identical reference numerals followed by the letter b. The brake linings 12b are here directly supported on clamping arms 40, 41 which thus also constitute the brake shoes. The arms 40, 41 terminate in the recessed extensions 29b and are thus pivoted directly on the spheres 31b which are lodged in their recesses 57b and the complementary recesses 58b of adjustable nuts 30b. These arms are under the action of restoring springs 32b which tend to maintain them in their illustrated normal position and prevent major lateral displacement thereof though permitting a limited rocking and longitudinal shifting.

The system so far described operates in essentially the same manner as that of FIGS. 3 and 4 in response to actuation of the Bowden wire 8b, 9b and rotation of the disk 1b; the linings 12b again engage the disk first near their lower edges 38b and then near their upper edges 39b. The magnitude of the obtainable amplification of the braking effort is determined by the distance of the linings 12b from the clamping fulcra 31b and from the ends of arms 40, 41 engaged by the elements 9b, 7b of the Bowden wire.

FIG. 5 also illustrates how a mechanical brake according to the invention may be used in co-operation with a hydraulic brake-actuating system. Pressure-transmitting pins 42, similar to the pins 27 of the preceding embodiment, link the arms 40, 41 with limited overall mobility to a pair of plungers 60 in respective cylinders 61 forming part of hydraulic actuators 43. The cylinders 61 are connected to sources of hydraulic fluid through conduits 62. A diaphragm 63, spanning each cylinder 61, holds the corresponding pin 42 in place.

The hydraulic system, acting centrally upon the linings 12b, will be effective as long as the arms 40, 41 are fully spread apart by the compression spring 10b of the Bowden wire. During manual operation, these arms will detach themselves from the pins 42 and operate independently of the plungers 60. The reinforcing effect of the camming assembly 29b, 30b, 31b will occur during both manual and hydraulic operation.

Our invention is, of course, not limited to the specific constructions described and illustrated but may be realized in various modifications and adaptations without departing from the spirit and scope of the appended claims; in particular, various features shown with reference to a specific embodiment may be incorporated, within the limits of compatibility, in a construction otherwise similar to a different disclosed embodiment.

We claim:

1. A self-energizing brake system comprising, in combination with a reversible disk rotatable relatively to a support, first mounting means secured to said support and including a pair of rotary bodies disposed at symmetrical locations on opposite sides of said disk, said bodies having axes of rotation substantially parallel to the disk surfaces; a pair of brake shoes formed with respective linings adjacent opposite eccentric surface areas of said disk, said brake shoes being provided with recesses of generally triangular cross-section respectively receiving minor portions of said bodies whereby said brake shoes and linings are respectively swingable about said axes of rotation; second mounting means for said brake shoes on said support maintaining said linings close to said surface areas with limited mobility about said axes and substantially transversely thereto in a generally chordal direction of said disk, said second mounting means including a pair of arms coupled with said brake shoes and extending beyond said linings on opposite sides of said disk; yieldable link means resiliently interconnecting said brake shoes and said mounting means to hold said brake shoes against said bodies; clamping means linked with said arms at locations remote from said linings for drawing them together whereby said linings partly engage said disk for rotary entrainment by the latter in said chordal direction to an extent sufficient to urge said linings into full-face contact with the disk surfaces through camming engagement between said rotary bodies and the respective recesses coacting therewith; and restoring means in engagement with said arms tending to maintain said linings spaced from said disk, said clamping means comprising a longer lever articulated at one end to one of said arms and a shorter lever articulated at one end to the other of said arms and at its other end to an intermediate point of said long lever, and a Bowden wire including a sheath anchored to said supporting means and a core anchored to the other end of said longer lever, both said levers being concurrently swingable in the same sense about their junctions with said arms.

2. A self-energizing brake system comprising, in combination with a reversible rotary disk, a pair of brake shoes having respective linings adjacent opposite eccentric surface areas of said disk and backing plates for said linings remote from said disk; stationary supporting means adjacent said disk; mounting means for said linings including a pair of arms on opposite sides of said disk, said arms having ends pivoted to said supporting means at symmetric locations with reference to said disk and further having free ends remote from said pivoted ends in engagement with frontal portions of said backing plates, said linings being held by said mounting means in line with portions of said arms spaced from said free ends and in a manner affording limited mobility to said linings in a generally chordal direction of said disk and about axes substantially transverse to said direction and parallel to said disk; mechanical clamping means linked with said free ends for urging frontal portions only of said shoe relatively close to said free ends toward each other and into contact with said disk, thereby causing limited entrainment of said linings by said disk upon rotation of the latter; first and second camming means on said supporting means positioned for co-operation with said mounting means upon such entrainment in a respective sense for forcing distal portions of said linings relatively remote from said free ends into contact with said disk each of said camming means including a respective recess formed in at least one of said support and mounting means, and roller bodies in said recesses, said recesses having ramp-like flanks inclined toward said disk for camming engagement by said bodies to urge said distal portions against said disk upon said entrainment of said linings thereby; link means connected with said mounting means for holding same against said roller bodies and resilient restoring means engaging said free ends for tending to maintain said linings spaced from said disk.

3. A self-energizing brake system comprising, in combination with a reversible disk rotatable relatively to a support, first mounting means secured to said support and including a pair of rotary bodies disposed at symmetrical locations on opposite sides of said disk, said bodies having axes of rotation substantially parallel to the disk surfaces; a pair of brake shoes formed with respective linings adjacent opposite eccentric surface areas of said disk, said brake shoes being provided with recesses of generally triangular cross-section respectively receiving minor portions of said bodies whereby said brake shoes and linings are respectively swingable about said axes of rotation; second mounting means for said brake shoes on said support maintaining said linings close to said surface areas with limited mobility about said axes and substantially transversely thereto in a generally chordal direction of said disk, said second mounting means including a pair of arms having ends pivoted to said support and coupled with said brake shoes and extending beyond said linings on opposite sides of said disk, yieldable link means resiliently interconnecting said brake shoes and said mounting means to hold said brake shoes against said bodies, said arms having free ends remote from said pivoted ends in engagement with frontal portions of said brake shoes; clamping means linked with said arms at locations remote from said linings for drawing them together whereby the frontal portions of said brake shoes engage said disk for rotary entrainment by the latter in said chordal direction to an extent sufficient to urge said linings into full-face contact with the disk surfaces through camming engagement between said rotary bodies and the respective recesses coacting therewith; and restoring means in engagement with said arms tending to maintain said linings spaced from said disk.

4. A system according to claim 3 wherein said arms have first extremities pivotally joined to said support and second extremities engaged by said clamping means, said second mounting means further including link means mechanically coupling said brake shoes with said arms at locations intermediate said extremities thereof and spaced from said recesses.

5. A system according to claim 4 wherein said arms are provided with longitudinal slots, said link means including spring-loaded bolts passing through said slots and secured to said brake shoes.

6. A system according to claim 4 wherein said link means comprises a pressure-transmitting pin of limited universal mobility inserted between each brake shoe and a respective one of said arms.

7. A self-energizing brake system comprising, in combination with a reversible disk rotatable relatively to a support, first mounting means secured to said support and including a pair of rotary bodies disposed at symmetrical locations on opposite sides of said disk, said bodies having axes of rotation substantially parallel to the disk surfaces; a pair of brake shoes formed with respective linings adjacent opposite eccentric surface areas of said disk, said brake shoes being provide with recesses of generally triangular cross-section respectively receiving minor portions of said bodies whereby said brake shoes and linings are respectively swingable about said axes of rotation; second mounting means for said brake shoes on said support maintaining said linings close to said surface areas with limited mobility about said axes and substantially transversely thereto in a generally chordal direction of said disk, said second mounting means including a pair of arms coupled with said brake shoes and extending beyond said linings on opposite sides of said disk; yieldable link means resiliently interconnecting sad brake shoes and said mounting means to hold said brake shoes against said bodies; clamping means linked with said arms at locations remote from said linings for drawing them together whereby said linings partly engage said disk for rotary entrainment by the latter in said chordal direction to an extent sufficient to urge said linings into full-face contact with the disk surfaces through camming engagement between said rotary bodies and the respective recesses coacting therewith; and restoring means in engagement with said arms tending to maintain said linings spaced from said disk, said support including a pair of bolts constituting fulcra for said arms, said bodies being rollers journaled on said bolts.

References Cited by the Examiner

UNITED STATES PATENTS 2,957,553  10/60  Chouings et al. _____ 188—73

FOREIGN PATENTS 728,709   1/53   Great Britain.
732,272   6/55   Great Britain.
788,841   1/58   Great Britain.
803,524  10/58   Great Britain.
863,150   3/61   Great Britain.
1,096,220 12/60  Germany.
1,196,289  5/59  France.

MILTON BUCHLER, *Primary Examiner.*

A. JOSEPH GOLDBERG, EUGENE G. BOTZ, ARTHUR L. LA POINT, *Examiners.*